(No Model.)

W. WILKINSON.
SHEARS.

No. 469,988. Patented Mar. 1, 1892.

Witnesses:
R. Schleicher.
Fred D. Goodwin.

Inventor:
William Wilkinson
by his Attorneys
Howson & Howson

UNITED STATES PATENT OFFICE.

WILLIAM WILKINSON, OF PHILADELPHIA, PENNSYLVANIA.

SHEARS.

SPECIFICATION forming part of Letters Patent No. 469,988, dated March 1, 1892.

Application filed August 18, 1891. Serial No. 403,049. (No model.)

*To all whom it may concern:*

Be it known that I, WILLIAM WILKINSON, a subject of the Queen of Great Britain and Ireland, residing in Philadelphia, Pennsylvania, have invented certain Improvements in Garden-Shears and in the Process of Making the Same, of which the following is a specification.

The object of my invention is to make light and cheap garden-shears, to be used especially for trimming grass, borders, and hedges. Garden-shears have usually been made of wrought-iron forged into shape and provided with steel cutting-edges welded to the blades of the shears. Consequently the shears have been very costly to manufacture and are heavy and clumsy in comparison to the shears made in accordance with my invention.

Figure 2:
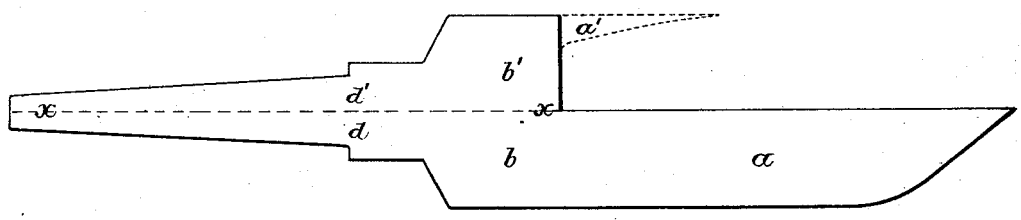
Figure 3:
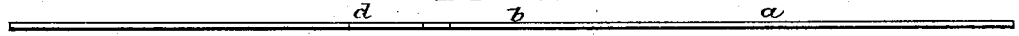
Figure 4:
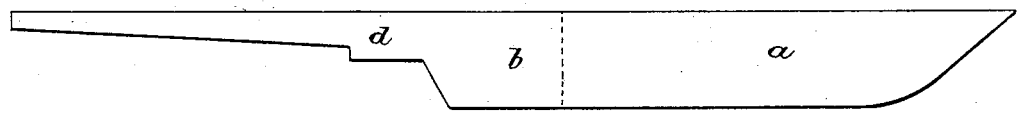
Figure 5:
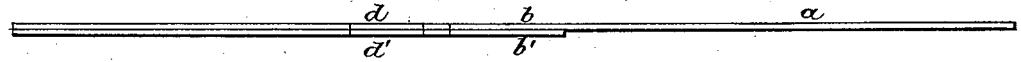
Figure 6:
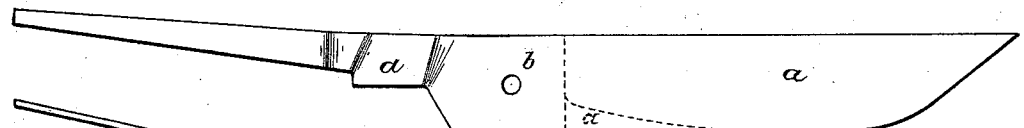
Figure 7:
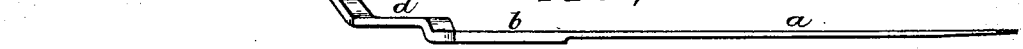
Figure 1:
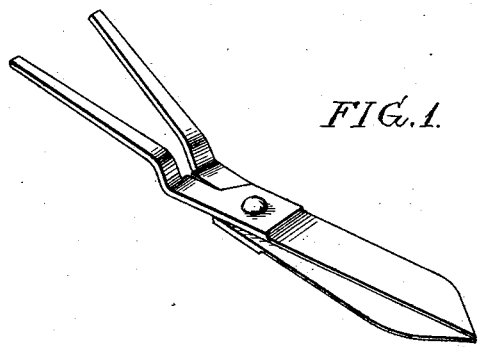

In the accompanying drawings, Figure 1 is a perspective view of a pair of shears made in accordance with my invention, the handles being omitted. Fig. 2 is a plan view of the blank from which one blade of the shears is made. Fig. 3 is a side view of said blank. Fig. 4 is a view showing the second step in the process. Fig. 5 is an edge view of Fig. 4. Fig. 6 is a view showing the third step in the process. Fig. 7 is an edge view of Fig. 6.

In carrying out my invention I prepare a piece of steel of the right thickness and cut it to shape, as shown in Fig. 2, either by means of dies or by shears, forming a blade portion $a$, the two pivot portions $b\ b'$, and the two shank portions $d\ d'$. This blank I bend on the line $x\ x$, Fig. 2, and turn the portions $b'$ and $d'$ under the portions $b$ and $d$, as shown in Fig. 4, and weld the two portions together, so that while the blank will be of a single thickness at the blade it will be double thick at the pivot-point and shank, where it is most needed. After the two parts are welded together, as shown in Fig. 5, the blank is struck up, as shown in Fig. 7, giving the desired form to the blade and shank portion, as shown in Figs. 6 and 7. The opposite blade of the shears is made in substantially the same manner, and the two blades, after being ground, are secured together by the ordinary pivot-pin, as shown in Fig. 1. In some instances, in order to stiffen the blades, I may form an extension $a'$ on the portion $b'$, as shown in Fig. 2, so that when the parts are welded together and finished a stiffening-rib will be formed upon the back of each blade, as shown by dotted lines in Fig. 6. This I find, however, is only essential in heavy shears.

I claim as my invention—

1. As a new article of manufacture, a shear-blade made from a single sheet of steel, having a blade portion $a$ of the single thickness of the sheet and the pivot and shank portions double the thickness of the sheet, bent and shaped substantially as set forth.

2. A blank for shear-blades, having the blade portion $a$, two pivot-sections $b\ b'$, the stiffening-section $a'$ for the back of the shears, and the shank portions $d\ d'$, the whole bent and welded, substantially as described.

In testimony whereof I have signed my name to this specification in the presence of two subscribing witnesses.

WILLIAM WILKINSON.

Witnesses:
EUGENE ELTERICH,
HENRY HOWSON.